(12) United States Patent
Blayvas (10) Patent No.: US 8,854,503 B2
(45) Date of Patent: Oct. 7, 2014

(54) IMAGE ENHANCEMENTS THROUGH MULTI-IMAGE PROCESSING

(75) Inventor: Ilya Blayvas, Holon (IL)

(73) Assignee: Broadcom Corporation, Irvine, CA (US)

( * ) Notice: Subject to any disclaimer, the term of this patent is extended or adjusted under 35 U.S.C. 154(b) by 204 days.

(21) Appl. No.: 13/490,976

(22) Filed: Jun. 7, 2012

(65) Prior Publication Data
US 2013/0329088 A1 Dec. 12, 2013

(51) Int. Cl.
*H04N 5/262* (2006.01)
*H04N 5/228* (2006.01)
*H04N 5/21* (2006.01)

(52) U.S. Cl.
USPC .................. 348/239; 348/222.1; 348/629

(58) Field of Classification Search
CPC ............ H04N 13/021; H04N 13/0214; H04N 5/23232

USPC .......................................................... 348/239
See application file for complete search history.

(56) References Cited

U.S. PATENT DOCUMENTS

| | | | | |
|---|---|---|---|---|
| 5,920,657 A | * | 7/1999 | Bender et al. | 382/284 |
| 2010/0271393 A1 | * | 10/2010 | Forutanpour et al. | 345/629 |
| 2011/0157474 A1 | * | 6/2011 | Nagata | 348/598 |

\* cited by examiner

*Primary Examiner* — Twyler Haskins
*Assistant Examiner* — Padma Haliyur
(74) *Attorney, Agent, or Firm* — McDermott Will & Emery LLP (57) ABSTRACT

Embodiments of imaging devices of the present disclosure automatically utilize sequential image captures in an image processing pipeline. In one embodiment, control processing circuitry initiates a sequential capture of a plurality of images by an image sensor; and image processing circuitry generates a composite image comprising at least portions of the images.

20 Claims, 8 Drawing Sheets

IMAGE ENHANCEMENTS THROUGH MULTI-IMAGE PROCESSING

BACKGROUND

As it relates to film and photography, depth of field is the distance between the nearest and farthest objects in a scene that appear acceptably sharp in an image. Although a lens can precisely focus at only one distance at a time, the decrease in sharpness is gradual on each side of the focused distance, so that within the depth of field, the imperfections in focus are imperceptible under normal viewing conditions. Auto-focus may be used to adjust the focus position of the lens, but auto-focus may cause the lens to focus at the wrong distance, to change focus during image capture, or to create other possible problems.

In some cases, it may be desirable to have the entire image sharp, and a large depth of field is appropriate. However, the depth of field for a scene is affected by various parameters including the focal length of the lens, the f-number of the optical system, the distance between the camera and the subject, and the size of the image sensor. These parameters may be determined or limited by the environment of the scene to be captured and the equipment available to perform the image capture. In some circumstances, it may be desirable to have a larger depth of field than is permitted by the scene and the imaging equipment. As a result, portions of the image may appear sharp, while others are undesirably out of focus.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

This disclosure provides systems and methods for automatically utilizing sequential image captures in an image processing pipeline of an imaging device such as, for example a digital camera or digital video camera. One of ordinary skill in the art would recognize that the techniques disclosed may also be applied to other contexts and applications as well. For cameras in devices such as, for example, digital cameras, digital video cameras, mobile phones, personal data assistants (PDAs), tablets, portable music players, desktop and/or laptop computers, etc., techniques such as those disclosed herein can improve image quality without incurring significant computational overhead or power costs.

To acquire image data, a digital imaging device may include an image sensor that provides a number of light-detecting elements (e.g., photodetectors) configured to convert light detected by the image sensor into an electrical signal. An image sensor may also include a color filter array that filters light captured by the image sensor to capture color information. The image data captured by the image sensor may then be processed by an image processing pipeline circuitry, which may apply a number of various image processing operations to the image data to generate a full color image that may be displayed for viewing on a display device, such as a monitor.

Embodiments of the present disclosure provide enhanced depth of field and continuous focus by sequentially capturing multiple images of a scene, each at a different focal distance. A composite image of the scene is created using portions of the scene that are sharpest from among the "intermediate" sequential images. In order to make an accurate comparison from among the sequential images, the orientation of the scene within the images as captured should be substantially similar. One technique, among others, for ensuring uniformity is capturing the images in rapid succession relative to the speed of movement in the scene.

Figure 1:
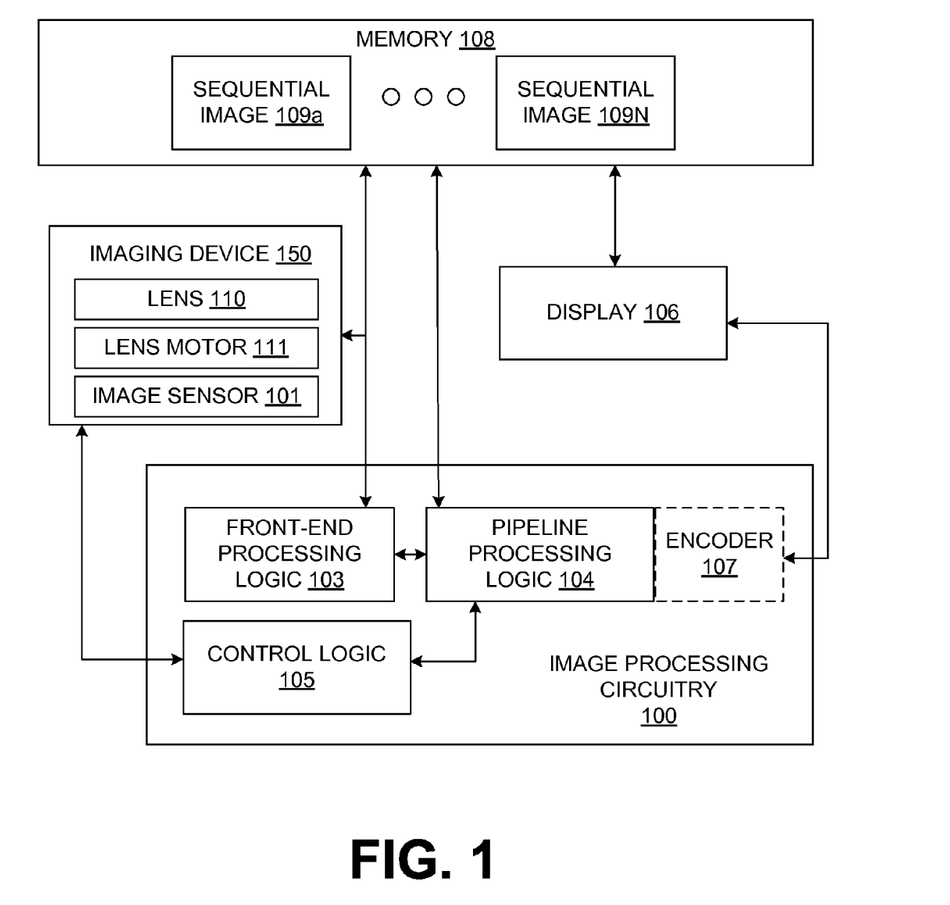
FIG. 1 is a block diagram of one embodiment of an image processing circuitry according to the present disclosure.

Referring to FIG. 1, a block diagram of one embodiment of an image processing circuitry 100 is shown for an imaging device 150. The illustrated imaging device 150 may be provided as a digital camera configured to acquire both still images and moving images (e.g., video). The device 150 may include a lens 110, a lens motor 111, and an image sensor 101. The lens motor 111 is configured to adjust at least the focal distance of the lens 110. As a non-limiting example, the lens motor 111 may include a sonic coil actuator, a piezoelectric actuator, and/or other type of motor as can be appreciated. The image sensor 101 may be configured to capture and convert light into electrical signals. As a non-limiting example, the image sensor 101 may include a CMOS (complementary metal-oxide-semiconductor) image sensor (e.g., a CMOS active-pixel sensor (APS)) or a CCD (charge-coupled device) sensor or other type of sensor as can be appreciated.

In some embodiments, the image processing circuitry 100 may include various subcomponents and/or discrete units of logic that collectively form an image processing "pipeline" for performing each of various image processing steps. These subcomponents may be implemented using hardware (e.g., digital signal processors or ASICs (application-specific integrated circuits)) or software, or via a combination of hardware and software components. The various image processing operations may be provided by the image processing circuitry 100.

The image processing circuitry 100 may include front-end processing logic 103, pipeline processing logic 104, and control logic 105, among others. The image sensor(s) 101 may include a color filter array (e.g., a Bayer filter) and may thus provide both light intensity and wavelength information captured by each imaging pixel of the image sensors 101 to provide for a set of raw image data that may be processed by the front-end processing logic 103.

The front-end processing logic 103 may receive pixel data from memory 108. For instance, the raw pixel data may be sent to memory 108 from the image sensor 101. The raw pixel data residing in the memory 108 may then be provided to the front-end processing logic 103 for processing.

Upon receiving the raw image data (from image sensor 101 or from memory 108), the front-end processing logic 103 may perform one or more image processing operations to produce one or more sequential images 109a-N. The sequential images 109a-N may then be provided to the pipeline processing logic 104 for additional processing prior to being displayed (e.g., on display device 106), or may be sent to the memory 108. The pipeline processing logic 104 receives the sequential images 109a-N, either directly from the front-end processing logic 103 or from memory 108, and may provide for additional processing of the image data in the raw domain, as well as in the RGB and YCbCr color spaces, as the case may be. Image data processed by the pipeline processing logic 104 may then be output to the display 106 (or viewfinder) for viewing by a user and/or may be further processed by a graphics engine. Additionally, output from the pipeline processing logic 104 may be sent to memory 108 and the display 106 may read the image data from memory 108. Further, in some implementations, the pipeline processing logic 104 may also include an encoder 107, such as a compression engine, etc., for encoding the image data prior to being read by the display 106.

The encoder 107 may be a JPEG (Joint Photographic Experts Group) compression engine for encoding still images, an H.264 compression engine for encoding video images, and/or other type of encoder. Also, it should be noted that the pipeline processing logic 104 may also receive raw image data from the memory 108.

The control logic 105 may include a processor 620 (FIG. 6) and/or microcontroller configured to execute one or more routines (e.g., firmware) that may be configured to determine control parameters for the imaging device 150, as well as control parameters for the pipeline processing logic 104. By way of example only, the control parameters may include sensor control parameters, camera flash control parameters, lens control parameters (e.g., focal distance for focusing or zoom), or a combination of such parameters for the image sensor(s) 101. The control parameters may also include image processing commands, such as autowhite balance, autofocus, autoexposure, and color adjustments, as well as lens shading correction parameters for the pipeline processing logic 104. The control parameters may further comprise multiplexing signals or commands for the pipeline processing logic 104.

Figure 2:
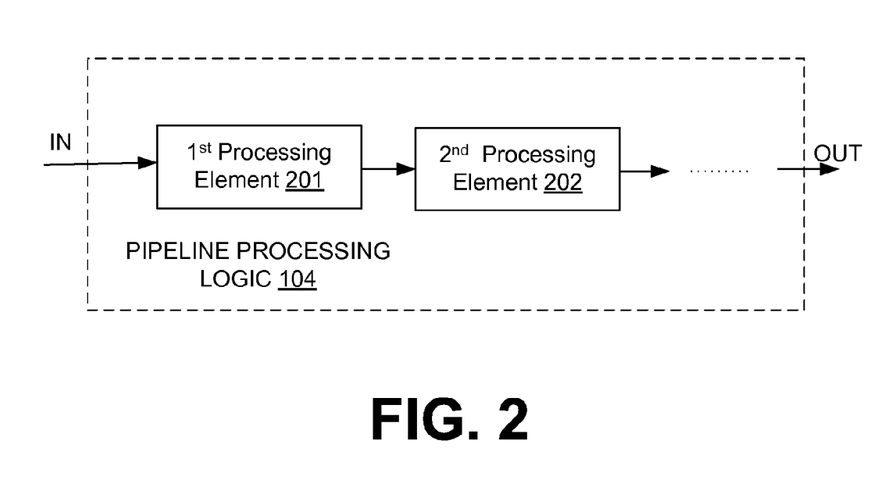
FIGS. 2-5 are block diagrams of embodiments of an image signal processing (ISP) pipeline implemented by the pipeline processing logic of the image processing circuitry of FIG. 1.
Figure 6:
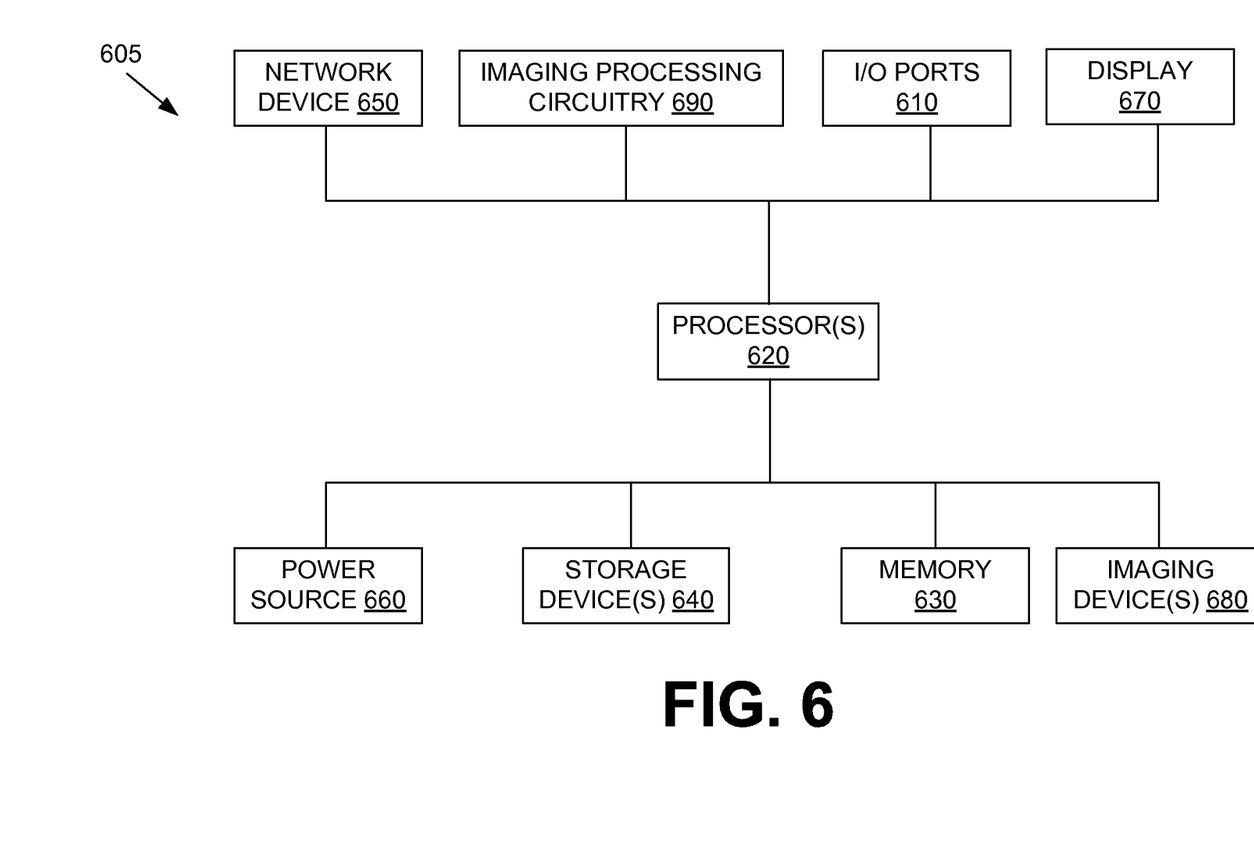
FIG. 6 is a block diagram illustrating an embodiment of an electronic device employing the image processing circuitry of FIG. 1.

Referring now to FIG. 2, one embodiment of the pipeline processing logic 104 may perform processes of an image signal processing (ISP) pipeline by first sending image information to a first process element 201 which may take the raw data produced by the image sensor 101 (FIG. 1) and generate a sequential image 109a-N or other digital image that will be viewed by a user or undergo further processing by a downstream process element. Accordingly, the processing pipeline may be considered as a series of specialized algorithms that adjusts image data in real-time and is often implemented as an integrated component of a system-on-chip (SoC) image processor. With an ISP pipeline implemented in hardware, front-end image processing can be completed without placing any processing burden on the main application processor 620 (FIG. 6).

In one embodiment, the first process element 201 of an ISP pipeline could perform a particular image process such as noise reduction, defective pixel detection/correction, lens shading correction, lens distortion correction, demosaicing, image sharpening, color uniformity, RGB (red, green, blue) contrast, saturation boost process, etc. As discussed above, the pipeline may include a second process element 202. In one embodiment, the second process element 202 could perform a particular and different image process such as noise reduction, defective pixel detection/correction, lens shading correction, demosaicing, image sharpening, color uniformity, RGB contrast, saturation boost process etc. The sequential image 109a-N or other digital image may then be sent to additional element(s) of the pipeline as the case may be, saved to memory 108 (FIG. 1), and/or input for display 106 (FIG. 1).

In one embodiment, an image process performed by a process element in the ISP pipeline is an enhanced depth of field process. The mode of operation for the enhanced depth of field process causes sequential images 109a-N to be captured by the image sensor 101. By taking multiple images sequentially and in rapid succession relative to the speed of the scene, the captured scene will be substantially similar in each image. In some embodiments, the sequential images 109a-N may undergo motion compensation to adjust for relative movement in the scene among the multiple images.

Focusing of the lens 110 (FIG. 1) may be controlled by control logic 105 (FIG. 1). Accordingly, the control logic 105 may cause the lens motor 111 (FIG. 1) to move the lens 110 continuously through the focus range while the image sensor 101 captures sequential images 109a-N along the way. The number of images captured in one pass of the focus range may be based upon the depth of field for each sequential image 109a-N, the capability of the imaging device, user preference, and/or other factors. In some embodiments, the focus range may be less than the complete focus range of the lens 110 based upon a user preference, information about the scene provided by sensors available to the imaging device, and/or information obtained from previously captured images.

Image processing in the image single processing pipeline may then take the sequential images 109a-N and combine them to produce a composite image with a greater depth of field. To this end, the single processing pipeline creates a composite image of the scene using portions of the scene that are the sharpest from among the sequential images 109a-N. The comparison of sharpness may be carried out using Fourier analysis, edge detection, and/or techniques as can be appreciated. The resulting composite image created effectively extends the depth of field beyond any one of the individual sequential images 109a-N by combining the "in focus" regions of all the sequential images 109a-N.

In some embodiments, only a selected region of the composite image uses portions of the scene that are the sharpest from among the sequential images 109a-N. The remaining regions of the composite image may use portions of the scene that are purposefully not the sharpest from among the sequential images 109a-N, such as may be used to create a "bokeh" effect.

In some embodiments, the enhanced depth of field process may be combined with an enhanced high dynamic range (HDR) process also performed by a process element 201, 202. A mode of operation for the enhanced HDR process causes the sequential images 109a-N to be captured by image sensors 101. Under the mode of operation for the enhanced HDR process, the multiple images of a scene captured at different focus positions are also captured at different exposure levels (e.g., different gain settings) and then combined to produce an image having an enhanced range for the particular characteristic. For example, an enhanced image of a scene may be produced with one portion having low exposure, another portion having a medium exposure, and another portion having a high exposure, depending on the number of images that have been sequentially captured. For a bright region of the scene, image information from a sequential image 109a-N with low exposure will be used, while for a dark region, image information from a sequential image 109a-N with high exposure will be used.

Accordingly, in an additional embodiment, an image process performed by a process element 201, 202 in the ISP pipeline is a corrective process. A mode of operation for the enhanced process causes sequential images 109a-N to be captured by the image sensor 101. By taking multiple images sequentially and in rapid succession relative to the speed of the scene, the captured scene will be substantially similar in each of the sequential images 109a-N. However, the scene as represented in the sequential images 109a-N may have shifted slightly due to relative motion between the scene and the imaging device during the capture process. Therefore, in the image process, the sequential images 109a-N may be compared to each other in order to compensate for the relative motion of the scene in the sequential images.

For example, a fast moving object in a scene may appear in slightly different locations in each of the sequential images 109a-N. In order to accurately compare portions of a scene from among the sequential images 109a-N, the image process may need to detect and compensate for motion in the scene among the images using various possible motion compensation and/or motion estimation techniques as can be appreciated.

Figure 3:
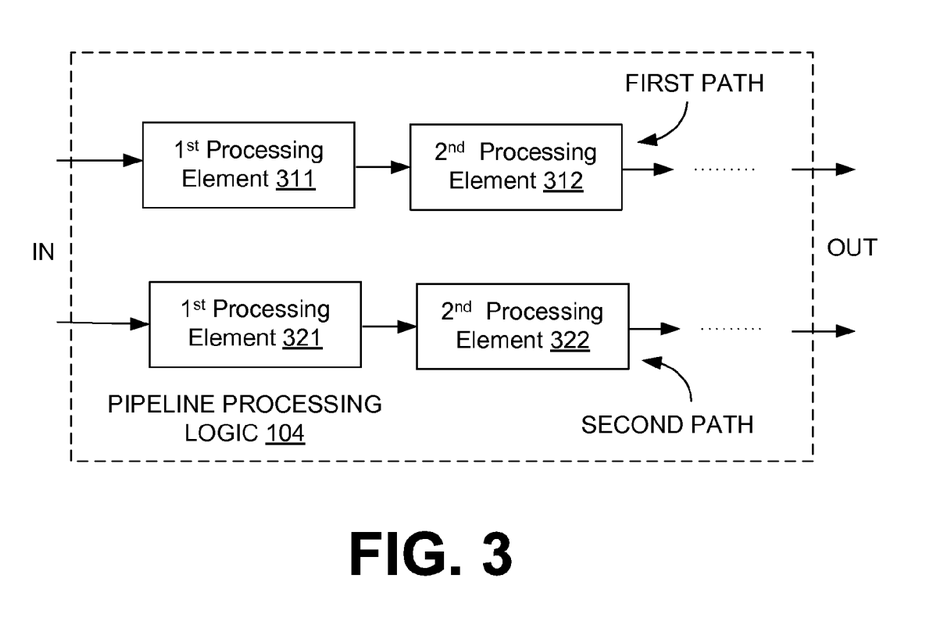

Referring next to FIG. 3, in one embodiment, an ISP pipeline implemented by pipeline processing logic 104 contains a plurality of parallel paths instead of a single linear path. As a non-limiting example, the parallel paths may provide a first path and a second path. Therefore, while a first captured image is being processed in the first path, a second captured image may be processed in the second and parallel path. It may be that the second path contains fewer stages or elements 321, 322 than the first path. Alternatively, the first path may contain the same number of or less number of stages or elements 311, 312 as compared to the second path. Further, the second path may involve resolution down-conversion of the image to lessen the amount of pixels that need to be processed during image processing, such as for image analysis, in the pipeline. The benefits of the parallel paths may apply to still images as well as video images captured by the image sensor 101 (FIG. 1). Use of parallel paths in the ISP pipeline may enable processing of multiple image data simultaneously while maximizing final image quality.

Figure 4:
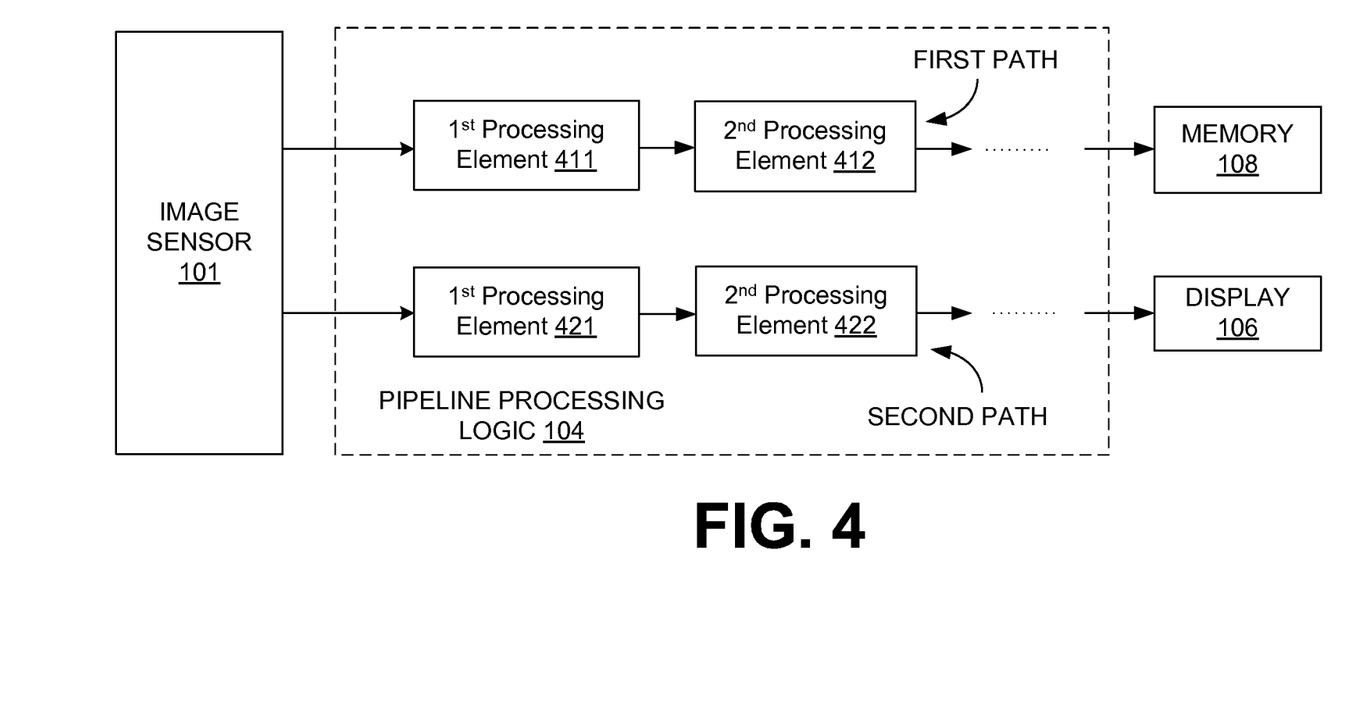

Referring to FIG. 4, in one embodiment of an image processing pipeline, processing elements 411, 412, may be divided up between elements that are suited for the main image and processing elements 421, 422 that are suited for the secondary image. Accordingly, a secondary image may be initially processed, such as being made smaller or scaled, for the benefit of downstream elements. As an example, the path of the secondary image may contain a noise filtering element due to a downstream element needed for the secondary image to have undergone noise reduction.

In some embodiments, the images generated by the first and second paths may be stored in memory 108 (FIG. 1) and made available for subsequent use by other procedures and elements that follow. Accordingly, in one embodiment, while a main image is being processed in a main path of the pipeline, another image which might be downsized or scaled of that image or a previous image may be read by the main path. This may enable more powerful processing in the pipeline, such as during noise filtering.

Also, in some embodiments, similar pixels in the multiple images may be processed once and then disparate pixels will be processed separately. It is noted that by taking multiple images sequentially and in rapid succession relative to the speed of the scene, the captured scene will be substantially similar in each image. Therefore, pixels of a first sequential image 109a-N may be processed in a main path of the pipeline. Additionally, similar pixels in a second sequential image 109a-N may be identified with a similarity mask, where the similar pixels are also contained in the first sequential image 109a-N (and are already being processed). After removal of the similar pixels in the second sequential image 109a-N, the remaining pixels may be processed in a secondary path of the pipeline. By removing redundant processing, significant power savings in the ISP pipeline may be realized.

Further, in some embodiments, the images generated by the first and second paths may be simultaneously displayed. For example, one display portion of a display 106 (FIG. 1) can be used to show a video (e.g., output from the first path) and a second display portion of the display 106 can be used to show a still image or "snap-shot" from the video (e.g., output from the second path) which is responsive to a pause button on an interface of the imaging device 150 (FIG. 1). Alternatively, an image frame may be shown in a split screen of the display (e.g., left section) and another image frame may be shown in a right section of the display. The imaging device may be configured to allow for a user to select a combination of sequential images 109a-N (e.g., the frames being displayed in the split screen) and then compared and combined by the image processing circuitry 100 (FIG. 1) to generate an enhanced image having improved image quality and resolution.

As previously mentioned, embodiments of the imaging device 150 may employ modes of operation that are selectable from interface elements of the device. Interface elements may include graphical interface elements selectable from a display 106 or mechanical buttons or switches selectable or switchable from a housing of the imaging device 150. In one embodiment, a user may activate an enhanced mode of operation, where sequential images 109a-N are captured and used to produce an image with enhanced characteristics (e.g., improved depth of field, HDR, etc.) that may be viewed or saved in memory 108.

In particular, in one embodiment, the image sensor 101 (FIG. 1) captures sequential images 109a-N, each with different exposure levels. A process element 201, 202 (FIG. 2) of an image signaling processing pipeline correlates and performs depth of field and/or HDR processing on different combinations of the sequential images 109a-N. The resulting images from the different combinations may be displayed to a user and offered for selection by the user as to the desired final image which may be saved and/or displayed. In some embodiments, a graphical interface slide-bar (or other user interface control element) may also be presented that allows gradual or stepwise shifting providing differing weighting combinations between sequential images 109a-N having different exposures. For video, such setting may be maintained across all frames.

Figure 5:
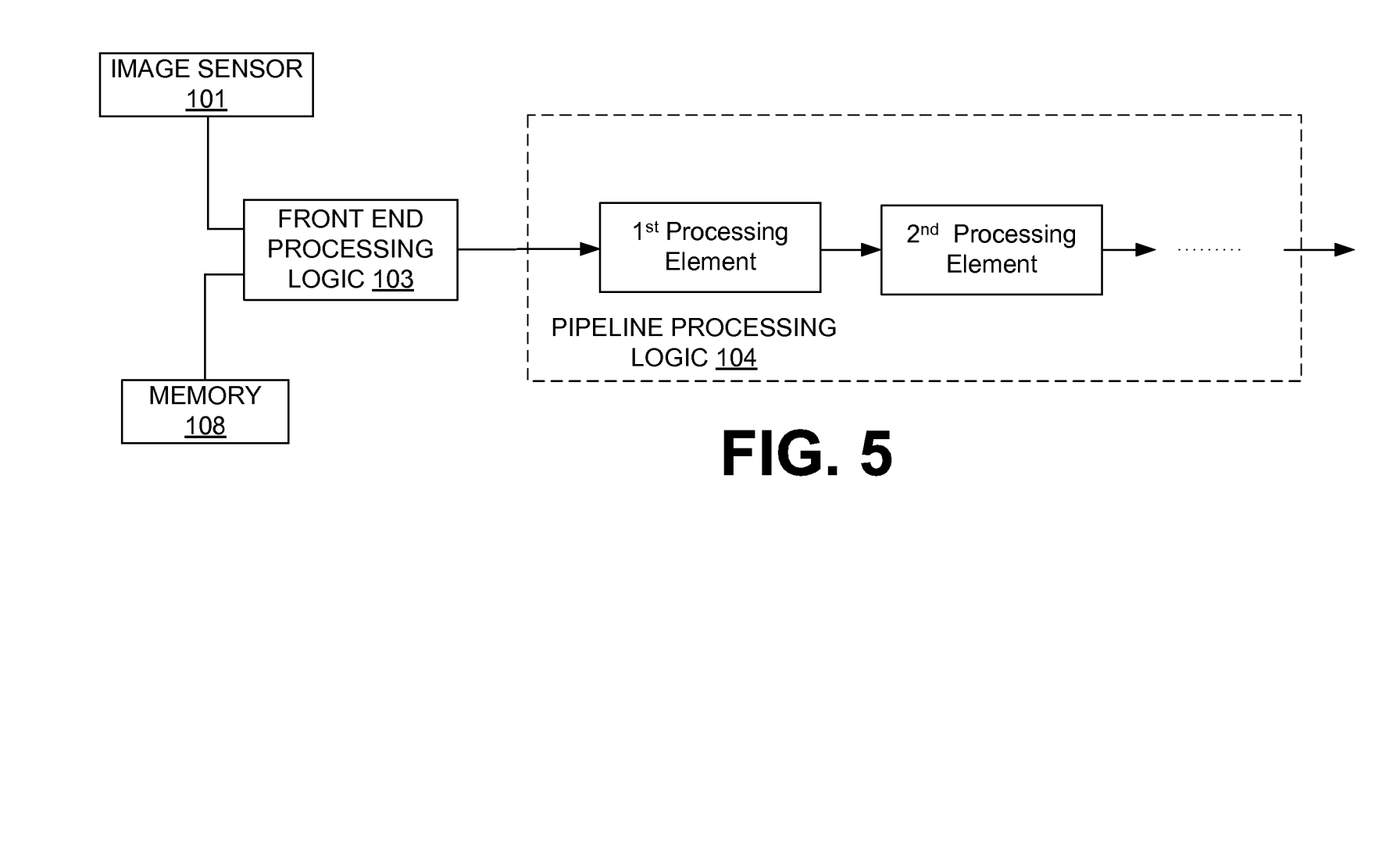

Multiplexing of the ISP pipeline may also be implemented. For example, consider enhanced image processing techniques, such as extended depth of field and HDR. Using these techniques, sequential images 109a-N may also be input in parallel to the ISP pipeline via multiplexing between the sequential images 109a-N, as represented in FIG. 5. The single image pipeline in pipeline processing logic 104 (FIG. 1) can therefore be multiplexed by front-end processing logic 103 (FIG. 1) between a plurality of sequential images 109a-N that are being input in parallel to the pipeline from the image sensor 101 and/or memory 108.

Therefore, instead of processing one of the images in its entirety after the other has been processed in its entirety, the images can be processed concurrently by switching processing of the images between one another as processing time allows by front-end processing logic 103. This reduces latency by not delaying processing of an image until completion of the other image, and processing of the two images will finish more quickly.

Keeping the above points in mind, FIG. 6 is a block diagram illustrating an example of an electronic device 605 that may provide for the processing of image data using one or more of the image processing techniques briefly mentioned above. The electronic device 605 may be any type of electronic device, such as a digital camera, a laptop, a desktop computer, a mobile phone, a tablet, a digital media player, and/or any device that is configured to receive and process image data, such as data acquired using one or more image sensing components.

Regardless of its form, the electronic device 605 may provide for the processing of image data using one or more of the image processing techniques briefly discussed above, among others. In some embodiments, the electronic device 605 may apply such image processing techniques to image data stored in a memory of the electronic device 605. In further embodiments, the electronic device 605 may include multiple imaging devices, such as an integrated or external digital camera or imager 101 (FIG. 1), configured to acquire image data, which may then be processed by the electronic device 605 using one or more of the above-mentioned image processing techniques.

As shown in FIG. 6, the electronic device 605 may include various internal and/or external components which contribute to the function of the device 605. Those of ordinary skill in the art will appreciate that the various functional blocks shown in FIG. 6 may comprise hardware elements (including circuitry), software elements (including computer code stored on a computer readable medium) or a combination of both hardware and software elements. For example, in the presently illustrated embodiment, the electronic device 605 may include input/output (I/O) ports 610, one or more processors 620, memory device 630, storage device 640, networking device 650, power source 660, and display 670. Additionally, the electronic device 605 may include imaging devices 680, such as digital cameras or imagers 101, and image processing circuitry 690. As will be discussed further below, the image processing circuitry 690 may be configured implement one or more of the above-discussed image processing techniques when processing image data. As can be appreciated, image data processed by image processing circuitry 690 may be retrieved from the memory 630 and/or the non-volatile storage device(s) 640, or may be acquired using the imaging device 680.

Before continuing, it should be understood that the system block diagram of the device 605 shown in FIG. 6 is intended to be a high-level control diagram depicting various components that may be included in such a device 605. That is, the connection lines between each individual component shown in FIG. 6 may not necessarily represent paths or directions through which data flows or is transmitted between various components of the device 605. Indeed, as discussed above, the depicted processor(s) 620 may, in some embodiments, include multiple processors, such as a main processor (e.g., CPU), and dedicated image and/or video processors. In such embodiments, the processing of image data may be primarily handled by these dedicated processors, thus effectively offloading such tasks from a main processor (CPU).

Figure 7:
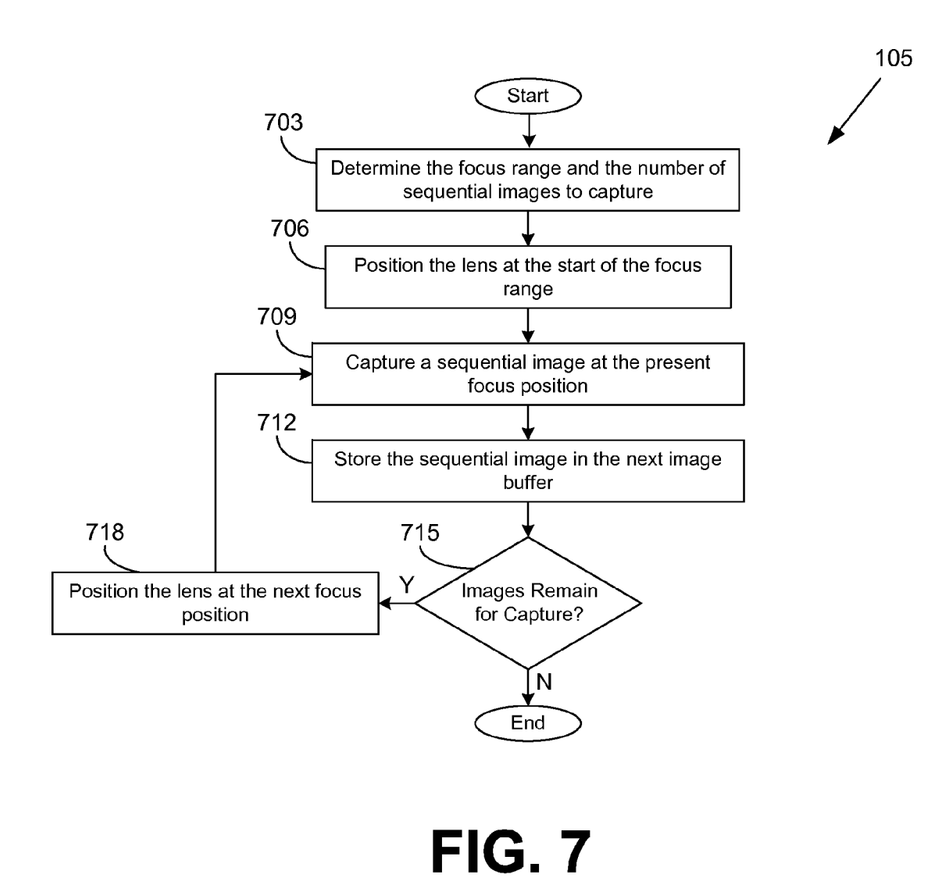
FIGS. 7 and 8 are flow chart diagrams depicting various functionalities of embodiments of image processing circuitry of FIG. 1.

Referring next to FIG. 7, shown is a flowchart that provides one example of the operation of a portion of the control logic 105 (FIG. 1) according to various embodiments. It is understood that the flowchart of FIG. 7 provides merely an example of the many different types of functional arrangements that may be employed to implement the operation of the portion of the control logic 105 as described herein. As an alternative, the flowchart of FIG. 7 may be viewed as depicting an example of steps of a method implemented in the electronic device 605 (FIG. 6) according to one or more embodiments.

Beginning in block 703, the control logic 105 (FIG. 1) determines the focus range to be used to capture sequential images 109a-N (FIG. 1) and the number of images to capture. The focus range may be the complete focus range of a lens 110 (FIG. 1) or the range may be limited to a shorter range. As a non-limiting example, using a shorter range may be appropriate if all the objects in a scene are near such that using a focus of infinity would not produce any objects in focus. The number of images to capture may be based upon the depth of field for each captured image, the capability of the imaging device, user preference, and/or other factors.

Next, in block 706, the control logic 105 instructs the lens motor 111 (FIG. 1) to position the lens 110 at the start of the focus range. Then, in block 709, the control logic 105 instructs the image sensor 101 (FIG. 1) to capture an image at the present focus position. Subsequently, in block 712, the control logic 105 may store the captured image in a memory 108 (FIG. 1). Next, in block 715, the control logic 105 may determine if further images remain to be capture for a given sequence. If all the images for a sequence have been captured, execution of this portion of the control logic 105 ends as shown.

Alternatively, if additional images remain to be captured, in block 718, the control logic 105 positions the lens at the next focus position and execution of the control logic 105 returns to block 709. In some embodiments, the lens 110 may continuously move during the capture process. In these embodiments, the control logic 105 in block 718 may not move the lens into position, but may instead determine the current position of the lens 110.

Figure 8:
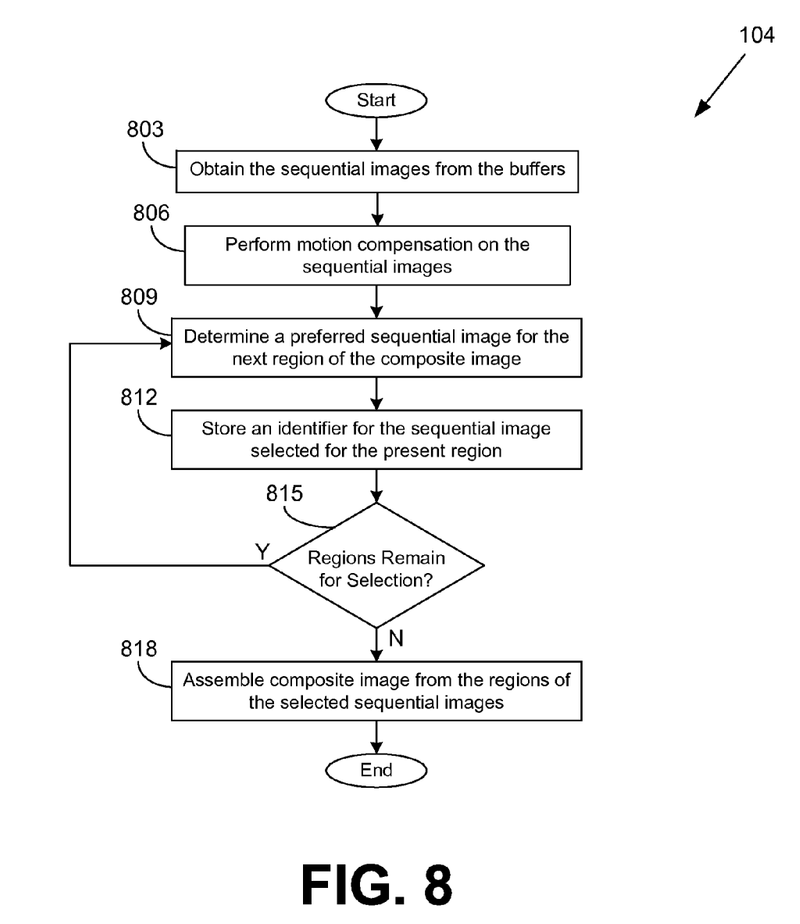

Next, referring to FIG. 8, shown is a flowchart that provides an additional example of the operation of a portion of the pipeline processing logic 104 according to various embodiments. It is understood that the flowchart of FIG. 8 provides merely an example of the many different types of functional arrangements that may be employed to implement the operation of the portion of the pipeline processing logic 104 as described herein. As an alternative, the flowchart of FIG. 8 may be viewed as depicting an example of steps of a method implemented in the electronic device 605 (FIG. 6) according to one or more embodiments.

Beginning in block 803, the image processing circuitry 100 may obtain captured images from the memory 108 (FIG. 1). Next, in block 806, the image processing circuitry may apply motion compensation to adjust for relative movement in the scene among the multiple images. By taking multiple images sequentially and in rapid succession relative to the speed of the scene, the captured scene will be substantially similar in each image. However, the scene as represented in the multiple images may have shifted slightly due to relative motion between the scene and the imaging device during the capture process. Therefore, in the image process, the sequentially captured images may be compared to compensate for the relative motion of the scene in the sequential images.

Then, in block 809, the image processing circuitry 100 may compare the sharpness of a selected region of the scene as captured in the images. The size of the portion examined may be a pixel or may be a larger area such as, for example, a macroblock. The comparison of sharpness may be carried out using Fourier analysis, edge detection, and/or techniques as can be appreciated. Next, in block 812, the image processing circuitry 100 may store an identifier for the particular image from which the portion will be used in the later composite image. In some embodiments, the image processing circuitry 100 may begin assembling the composite image rather than waiting until the source for each portion of the composite image is determined before beginning assembly.

Then, in block 815, the image processing circuitry 100 determines if additional portions of the composite image exist for which a source has not been selected. If additional portions remain for selection, execution of the image processing circuitry 100 returns to block 809. Alternatively, if all the portions for a composite image have identified sources, then, in block 818, the image processing circuitry 100 may begin assembling the composite image using portions from the respective captured images previously identified. Thereafter, this portion of the execution of the image processing circuitry 100 ends as shown.

Any process descriptions or blocks in flow charts should be understood as representing modules, segments, or portions of code which include one or more executable instructions for implementing specific logical functions or steps in the process, and alternate implementations are included within the scope of embodiments of the present disclosure in which functions may be executed out of order from that shown or discussed, including substantially concurrently or in reverse order, depending on the functionality involved, as would be understood by those reasonably skilled in the art.

In the context of this document, a "computer readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of certain embodiments includes embodying the functionality of the embodiments in logic embodied in hardware or software-configured mediums.

It should be emphasized that the above-described embodiments are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, having thus described the invention, at least the following is claimed:

1. An imaging device, comprising:
   a memory that stores a plurality of sequential images;
   an image sensor that captures the sequential images, each of the sequential images comprising a representation of an object captured at a focus position of a lens, the focus position being different for each of the sequential images; and
   processing circuitry configured to:
      assemble a composite image of the object comprising a plurality of pixels by:
         identifying, for each pixel of the plurality of pixels, a respective pixel of one of the sequential images by comparing respective pixels of the plurality of sequential images, the identified respective pixel having a degree of sharpness at least as great as a corresponding pixel of remaining sequential images; and
         using information associated with the identified respective pixel to determine pixel data for each pixel of the plurality of pixels of the composite image, each of the pixels of the plurality of pixels of the composite image matching a respective pixel of one of the sequential images.

2. The imaging device of claim 1, wherein each of the sequential images is captured at a different time.

3. The imaging device of claim 1, further comprising logic that determines a count of the sequential images needed, wherein the count is based at least upon a focal ratio of the imaging device.

4. The imaging device of claim 1, wherein the respective pixel has a different pixel location within the one of the sequential images than the corresponding pixel of the remaining sequential images.

5. The imaging device of claim 1, wherein the composite image captures portions of the scene that are sharpest among the plurality of sequential images.

6. The imaging device of claim 1, wherein each of the sequential images are captured at a degree of exposure, the degree of exposure being different for a subset of the sequential images.

7. The imaging device of claim 6, wherein the pixels of the composite image are selected from the subset of the sequential images.

8. The imaging device of claim 1, wherein the processing circuitry is further configured to generate a video based upon a temporal sequence of images comprising the composite image.

9. A method, comprising:
   capturing, in an imaging device, a plurality of sequential images, each of the sequential images comprising a representation of an object captured at a focus position of a lens, the focus position being different for each of the sequential images;
   generating, in the imaging device, a composite image of the object comprising a plurality of regions by:
      identifying, for each region of the plurality of regions, a respective region of one of the sequential images by comparing respective regions of the plurality of sequential images, the identified respective region having a focus accuracy at least as great as a corresponding region of remaining sequential images used to capture the portion; and
      using information associated with the identified respective region to determine data for each region of the plurality of regions of the composite image, each of the regions of the composite image matching a respective region of one of the sequential images.

10. The method of claim 9, further comprising storing the composite image in a memory.

11. The method of claim 9, wherein the composite image captures portions of the scene that are sharpest among the plurality of sequential images.

12. The method of claim 11, wherein a first subset of the plurality of regions of the composite image have the focus accuracy at least as great as the corresponding region of remaining sequential images, and a second subset of the regions of the composite image have the focus accuracy no greater than the corresponding region of at least one of the sequential images.

13. The method of claim 11, wherein a subset of the regions of the composite image are selected concurrently.

14. The method of claim 9, wherein the sequential images are captured within 50 milliseconds.

15. The method of claim 9, wherein a count of the sequential images captured varies based at least upon a focal length of the lens.

16. The method of claim 9, further comprising generating, in the imaging device, a video based upon a temporal sequence of images comprising the composite image.

17. An imaging device, comprising:
capturing means for capturing a plurality of sequential images, each of the sequential images comprising a representation of an object captured at a focus position of a lens, the focus position being different for each of the sequential images;
processing means for generating a composite image of the object comprising a plurality of pixels by:
identifying, for each pixel of the plurality of pixels, a respective pixel of one of the sequential images by comparing respective pixels of the plurality of sequential images, the identified respective having a degree of sharpness at least as eat as a corresponding pixel of remaining sequential images; and
using information associated with the identified respective pixel to determine pixel data for each pixel of the plurality of pixels of the composite image, each of the pixels of the plurality of pixels of the of the composite image matching a respective pixel of one of the sequential images.

18. The imaging device of claim 17, further comprising processing means for compensating for relative motion between the imaging device and the object.

19. The imaging device of claim 17, wherein each of the sequential images is captured at a different time.

20. The imaging device of claim 17, further comprising counting means for determining a count of the sequential images needed, wherein the count is based at least upon a distance between the imaging device and the object.

\* \* \* \* \*